US008654402B2

United States Patent
Mestha et al.

(10) Patent No.: US 8,654,402 B2
(45) Date of Patent: Feb. 18, 2014

(54) PITCH BASED HIGH QUANTIZATION HALFTONE DOT LINEARIZATION FOR RENDERING HIGH QUALITY COLOR IMAGES

(75) Inventors: Lalit Keshav Mestha, Fairport, NY (US); Richard Leighton Howe, Webster, NY (US); Raja Bala, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 824 days.

(21) Appl. No.: 12/472,689

(22) Filed: May 27, 2009

(65) Prior Publication Data

US 2009/0296156 A1    Dec. 3, 2009

Related U.S. Application Data

(60) Provisional application No. 61/056,356, filed on May 27, 2008.

(51) Int. Cl.
*G06K 15/00* (2006.01)

(52) U.S. Cl.
USPC ............ 358/3.06; 358/1.9; 358/505; 358/406

(58) Field of Classification Search
USPC .................................. 358/3.06, 1.9, 504, 406
See application file for complete search history.

(56) References Cited

U.S. PATENT DOCUMENTS

| | | | |
|---|---|---|---|
| 6,538,770 B1 | 3/2003 | Mestha et al. | |
| 6,560,417 B1 | 5/2003 | Rodriguez | |
| 7,239,820 B2 | 7/2007 | Donaldson | |
| 7,277,196 B2 | 10/2007 | Van de Capelle et al. | |
| 7,307,752 B1 | 12/2007 | Mestha et al. | |
| 7,483,186 B2 | 1/2009 | Viturro et al. | |
| 2006/0227395 A1 | 10/2006 | Mestha et al. | |
| 2006/0251437 A1* | 11/2006 | Donaldson | 399/49 |
| 2007/0076273 A1* | 4/2007 | Viturro et al. | 358/504 |
| 2008/0007802 A1* | 1/2008 | Viturro et al. | 358/504 |
| 2008/0247770 A1* | 10/2008 | Morales et al. | 399/49 |

OTHER PUBLICATIONS

Mestha et al., "Gray Balance Control Loop for Digital Color Printing Systems", Sep. 2005, p. 499-504, Socieity for Imaging Science and Technology, NIP21: International Conference on Digital Printing Technologies; ISBN / ISSN: 0-89208-257-7.*
Mestha et al., "Gray Balance Control Loop for Digital Color Printing Systems", 2005, pp. 499-504, Society for Imaging Science and Technology, 21$^{st}$ International Conference on Digital Printing Technologies Final Program and Proceedings.
Colorwiki, Delta E: The Color Difference, 4 pages, printed May 12, 2009, Article originally appeared in CHROMiX ColorNews Issue 17 on Feb. 18, 2005. http://www.colorwiki.com/wiki/Delta_E:_The_Color_Difference.

* cited by examiner

*Primary Examiner* — Jacky X Zheng
(74) *Attorney, Agent, or Firm* — Fay Sharpe LLP

(57) ABSTRACT

A device, system, and method for reducing the pitch-to-pitch variation of color using pitch-based linearization of halftone screens are presented. A selection of images is printed at different pitches, and each image is measured and tracked with its pitch. Pitch-based TRCs are constructed using patches, which may be scheduled during print run or during machine diagnostic process and halftone dots are constructed and uploaded in the image path for each pitch. The updated dots are then used to produce a linearized halftone image for transfer to a print surface which results in improved color balance.

13 Claims, 5 Drawing Sheets

PITCH BASED HIGH QUANTIZATION HALFTONE DOT LINEARIZATION FOR RENDERING HIGH QUALITY COLOR IMAGES

This application claims the priority benefit of U.S. provisional patent application Ser. No. 61/056,356, filed May 27, 2008, the disclosure of which is incorporated herein by reference.

BACKGROUND

Halftones used in the printing process are comprised of dots. Such dots are arranged in a pattern to form an image. Colors used in such dots are calibrated to a standard set of colors in a process called linearization. Through the act of repeated printings, a print device may become out of alignment resulting in a disruption of the expected print paper, such as streaking or splotching. There is a current need in the art for an improved means by which the printing device may be put back into alignment with the standard set of colors.

Accordingly, there is disclosed herein a method and/or system which overcomes the above referenced problems.

INCORPORATION BY REFERENCE

U.S. Patent Application Publication No. US 2006/0227395 A1 titled "Systems and Methods for Printing Images Outside a Normal Color Gamut in Image Forming Devices", by Mestha et al., filed Apr. 6, 2005; U.S. Pat. No. 7,239,820 B2 titled "Tone Reproduction Curve Systems and Methods", by Donaldson, issued Jul. 3, 2007; U.S. Pat. No. 7,277,196 B2 titled "Iterative Printer Control and Color Balancing System and Method Using a High Quantization Resolution Halftone Array to Achieve Improved Image Quality With Reduced Processing Overhead", by Van de Capelle et al., issued Oct. 2, 2007; and U.S. Pat. No. 7,307,752 B1 titled "On-Line Calibration System for a Dynamic Varying Color Marking Device", by Mestha et al., issued Dec. 11, 2007, each of which are incorporated herein in their entirety.

BRIEF DESCRIPTION

The present application presents a new and novel device, system, and method for reducing the pitch-to-pitch variation of dots in the dot pattern of a halftone. The present application uses pitch dependent halftone dots to perform calibration or color correction functions. Pitch-based TRCs are constructed using patches, which may be scheduled during print run or during machine diagnostic process and half tone dots are constructed for each pitch. The updated halftone dots produce a linearized halftoned image on a per pitch based. The pitch based halftone dots are used in the image path to create improved color balance.

DETAILED DESCRIPTION

Figure 1A:
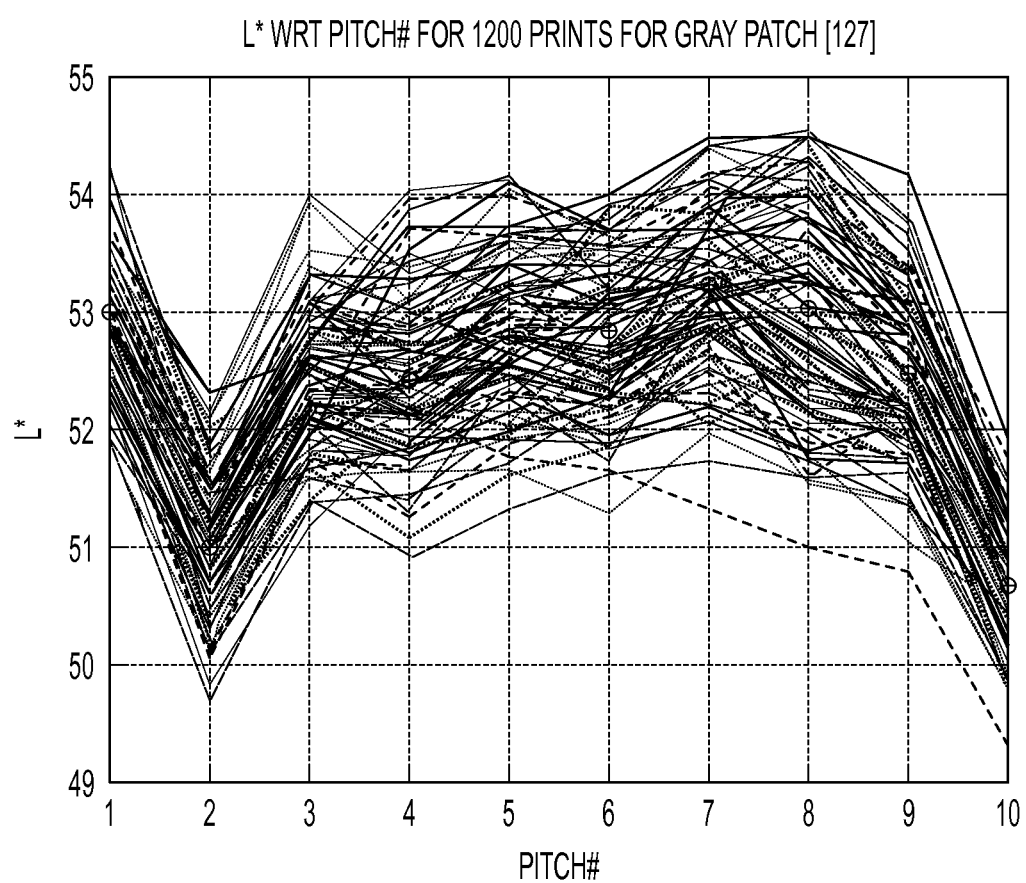
FIGS. 1(a)-1(c) are graphical illustrations of the pitch signature.

In U.S. Pat. No. 7,307,752 (incorporated by reference herein in its entirety), there is disclosed a system and/or method for performing gray balance calibration to achieve high quality and consistent color balanced printing for printers with periodic pitch-to-pitch variations. A "pitch" is the area on the imaging element (photoreceptor) allocated to a single image. In many architectures imaging elements are long enough in the process direction to have multiple pitches on them over the course of their circumference. The magnitude of pitch signature change was significant with time. See, e.g., FIG. 1(a-c). In any event, the '752 patent generally disclosed gray balanced tone reproduction curves (TRCs) that were updated from time-to-time for each pitch.

A TRC is a monotonically increasing marking device function in input-output contone space or input-output density space or input-output byte space, or combinations thereof. TRCs are stored functions of an input parameter value versus an output parameter value for a particular tone. Inaccuracies in the TRC construction step can lead to inaccuracies in the 3D LUT and poor color balance performance in the reproduced image.

Obtaining TRCs for a particular color marking engine is a calibration process, which can be constructed by printing predetermined target colors and measuring the printed target colors using insitu color sensors. Predetermined target colors can be printed as chronological jobs in the banner sheet/header sheet or else the target colors can be extracted from the customer image and measured either by measuring straight from the output image or by rendering subsets of customer colors as target color patches in banner and header pages. (c.f. copending Xerox application Ser. No. 09/449,263, now U.S. Pat. No. 6,538,770, L. K. Mestha, inventor, for a control system using dual mode banner color test sheets, herein incorporated by reference.) Using the target colors and their measured counterparts, and by processing the measured colors, TRCs are adjusted on-line at some desired intervals or on request during system or color balance set ups.

In accordance with previous disclosed approaches, different TRCs were constructed (e.g., in 8-bit contone space on a per pitch basis) by using digital counts (e.g., between 0 to 255 for a CMYK color space) as actuators. However, in accordance with the present disclosure, it has been discovered that good linearization can be achieved by adjusting halftone dots, and accordingly it is proposed in the present disclosure to employ halftones as actuators for every pitch. That is to say, the extension of previous method and/or systems as proposed herein would make the current halftone based TRC linearization or any other corrections thereafter (1D gray balance or 1D TRC) pitch dependent.

Linearization refers to the calibration process whereby a requested input color is mapped to an output color level that produces a desired tone response. There are several ways to define this tone response. One includes achieving a gray-balanced tone response for certain combinations of colorants (e.g. C=M=Y). Another involves linearizing each color separation to a predetermined quantity such as optical density or $\Delta E$ from paper. The latter specifies the visual difference between the color obtained with a given amount of colorant and that of plain paper. Visual color difference can be measured with standard metrics such as $\Delta E76$ or DE2000. An output device is typically linearized to such a metric by outputting a test file containing small patches of data. Each patch on the resulting file is measured with a measurement device such as a densitometer or a spectrophotometer and recorded in the calibration software. The result is a transformation or filter through which all future files are output.

Generally, one dimensional TRC calibration adjusts the contone CMYK values, which can limit the image color control and exacerbate quantization artifacts. Careful handling of color quantization is important for obtaining smooth images with no device induced artifacts. Since the color data obtained on some printers can have a strong and systematic dependency to the pitch, and the use of halftones can improve the quantization to greater than 8-bits (e.g., up to 1000 or greater levels), it is proposed herein to use pitch dependent halftone dots as actuators for performing calibration or color correction functions. Generally, to obtain pitch-based TRCs, patches are scheduled and halftone dots are constructed for each pitch carefully. As a result, the presently disclosed approach is expected to achieve improved image quality.

Slight changes in the optical density introduced by differences in laser/LED bar intensities, subsystem non-uniformities, donor roll reload, pitch-to-pitch variation in photoreceptor belt or in the IBT (Intermediate Belt Transfer) system, etc., can lead to image quality differences in the printed image. Of the many image quality defects (coarse and fine), photoreceptor variations are among the root causes for consistency errors in images. For example, in some instance, there can be observed substantial differences in color (particularly for gray patches CIELab $\Delta E$ numbers greater 3) when the same gray images are printed on different pitches in the P/R. This difference can be even larger in CIELab space for saturated colors.

Figure 1B:
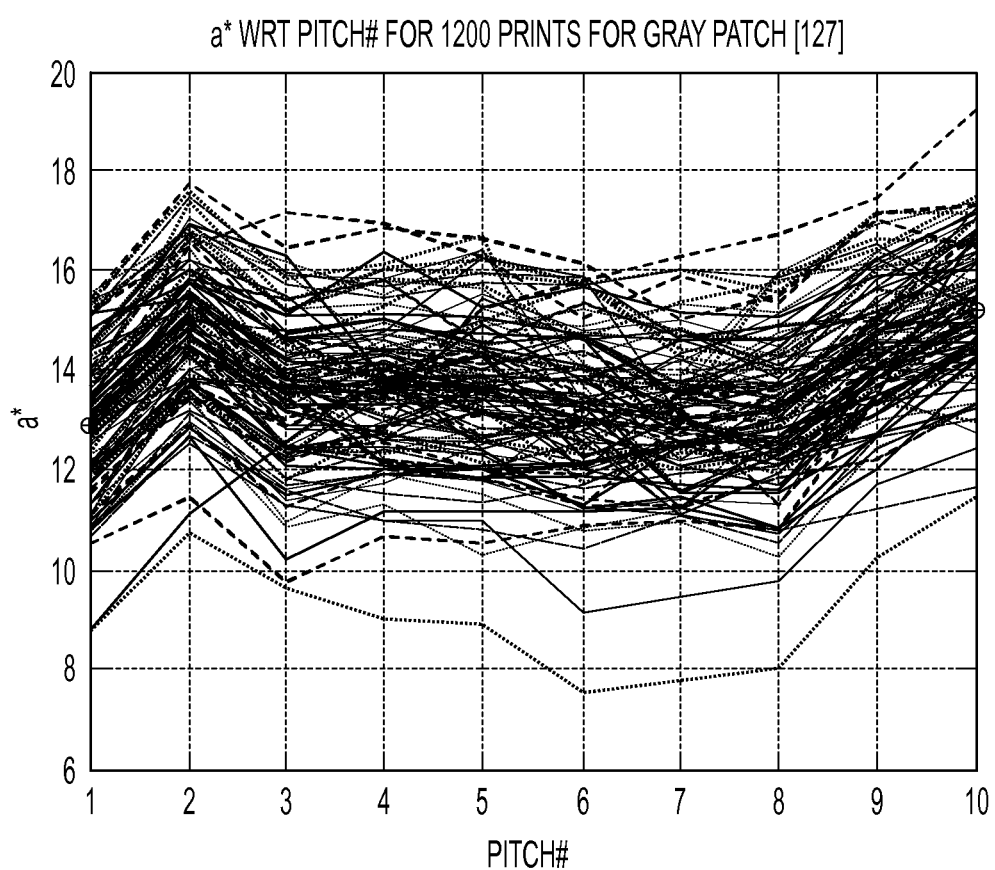
Figure 1C:
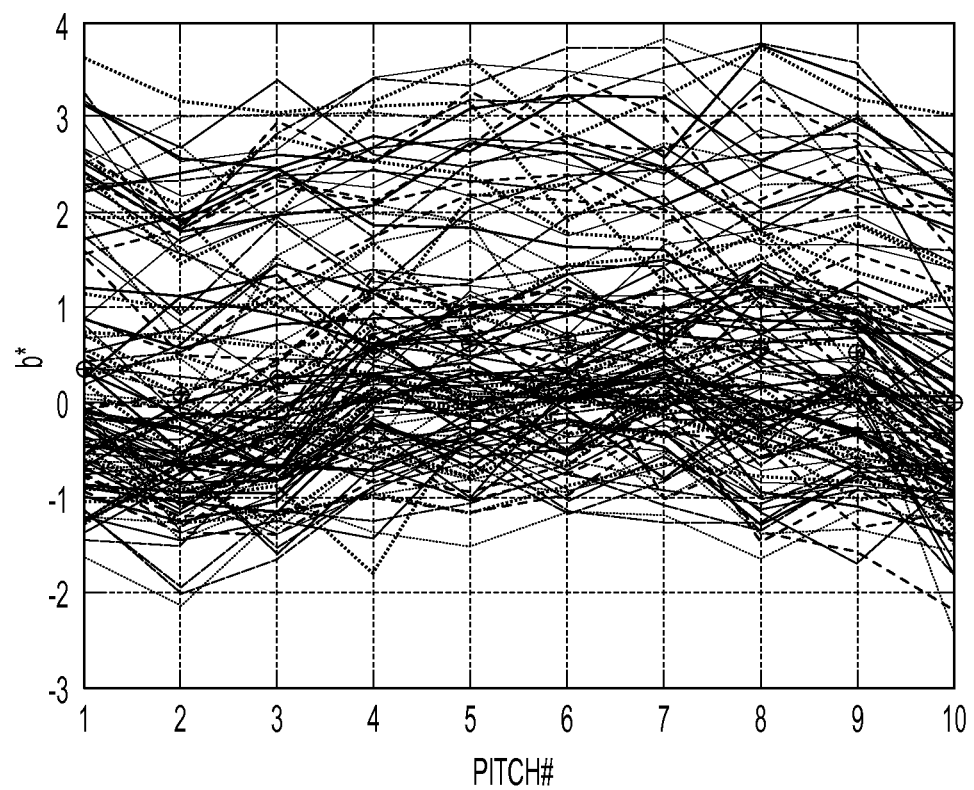

FIG. 1(a) presents an example which shows an L* plot of 50% gray patches with respect to pitch number, printed for 120 photoreceptor belt revolutions. FIGS. 1(b) and (c) show the corresponding a*, b* plots for 50% gray patches. Mean L*, a* and b* values are indicated thereon.

If the pitch-to-pitch variation is reduced by calibrating with pitch based TRCs, there will be improvement to the image quality. Using 8-bit quantized TRCs can limit the improvement achievable. Especially in 8-bit image path channels, where the individual channels are all 8-bit values, to achieve accurate rendering higher bit quantization is important. Applying corrections to 8-bit values and keeping the result of this correction as an 8-bit value can produce banding, or contouring, i.e. visual steps reducing the image quality. This can be seen in smooth vignettes and contone images with smooth gradations.

In the present disclosure, it is proposed to extend the previous pitch-to-pitch gray balance with one halftone screen across all the pitch-to-pitch dependent halftone linearizations. As one form of implementation, the halftone dots linearization with TRCs can be extended to pitch dependent dot linearization, in which halftones are customized to each pitch during the process of building the halftone dots. This approach can be implemented in the DFE (Digital Front End) or in the image path inside the Color Rendition Module of the printer or other marking device.

The digital front end (DFE) comprises a conventional image color separation path for processing an input image as specified in device independent parameters into CMYK printing parameters acceptable by the printer. A 3D LUT transforms the original image in device independent space to CMYK space. Incorporated within the LUT is an undercolor removal/gray component replacement that determines the relative proportion of K vs. CMY. Linearization of the Tone Reproduction Curve (TRC) comprises a calibration process which is the subject of the present application. The particular linearized signal resulting from the TRC is converted into a halftone imaging before actual printing by the marking device.

Suitably, inline sensors are used. Accordingly, performing such calibration can be accomplished easily. The use of such an approach is beneficial since the image quality is expected to improve with these methods since the pitch based halftone screens can offer higher quantization correction. For example, in one implementation such as to obtain pitch-based TRCs patches, patches have to be scheduled carefully. Optionally, one can use the Aapcon ILS or X-Rite ILS, or another suitable in-line spectrophotometer or other like color measurement device, to perform the measurements in-situ. An offline spectral sensor can also be used for measuring colors on a printed sheet. When pitch based halftone linearization is initiated multiple copies are suitably printed and measured. For example, to create the halftone dots for the first pitch using 21 patches per separation (See U.S. Pat. No. 7,239,820 for dot linearization, and U.S. Pat. No. 7,277,196 for gray balance, both incorporated by reference herein in their entirety), it is proposed to run a 10 pitch PR (photoreceptor) belt, 21 revolutions for each separation. During the calibration process, the system suitably keeps track of the pitch and updates the corresponding linearization for the halftone screen. Subsequently, during image printing, the half toning module in the real-time image path suitably applies the halftone screen with the appropriate linearization corresponding to the pitch being used. To practice one suitable embodiment, in the device a mechanism is made available within the print engines to identify the pitch state of the P/R. One can therefore employ a means to communicate this information to the halftoner within the print engine. Optionally, one merely conveys the correct starting pitch for a given job to the halftoner. Subsequently, the halftoner would then sequentially cycle through the linearization TRCs corresponding to each consecutive pitch as the job run proceeds. A suitable embodiment would execute all the pitch-dependent tracking and correction within the engine itself, so that the DFE is presented with a stable engine that produces consistent color across all pitches. This would make upstream DFE functions such as profiling and spot color control easier and more effective.

Figure 2:
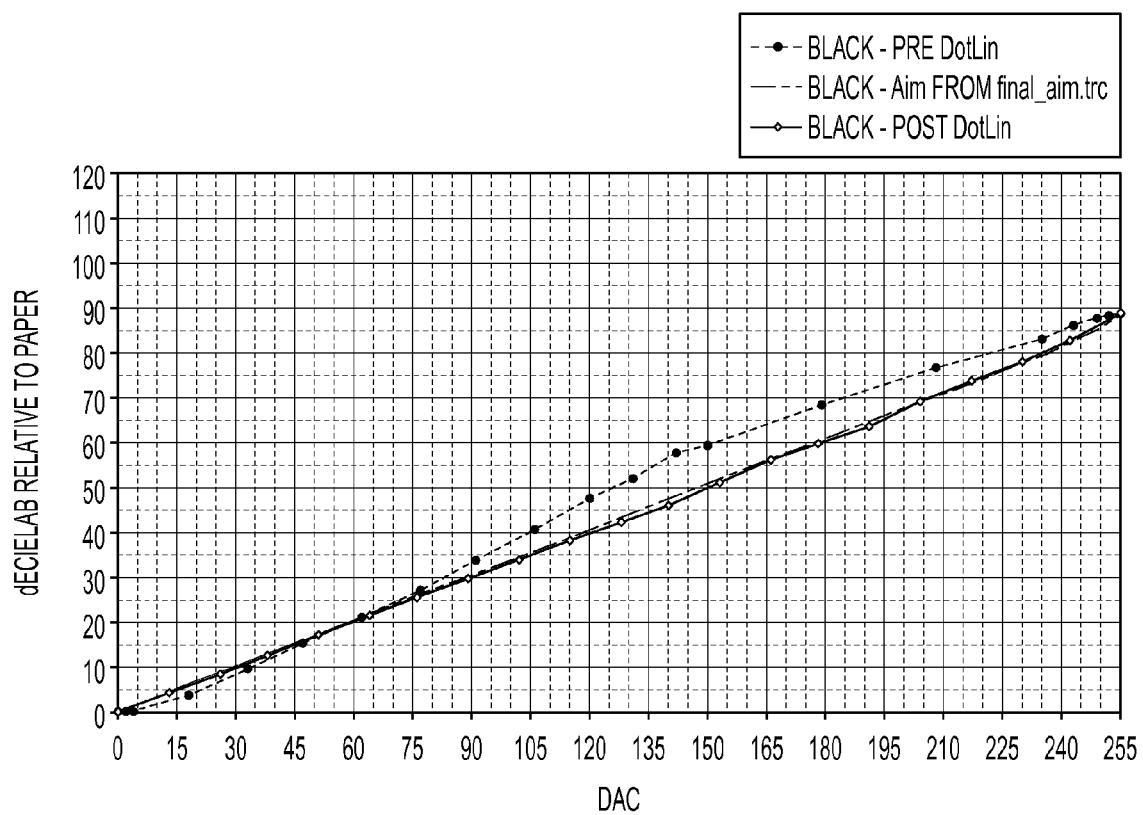
FIG. 2 is a graphical illustration of the tone reproduction curve.

FIG. 2 shows what the TRCs look like before and after dot linearization is done. This graph is one such example, for the color black.

Figure 3:
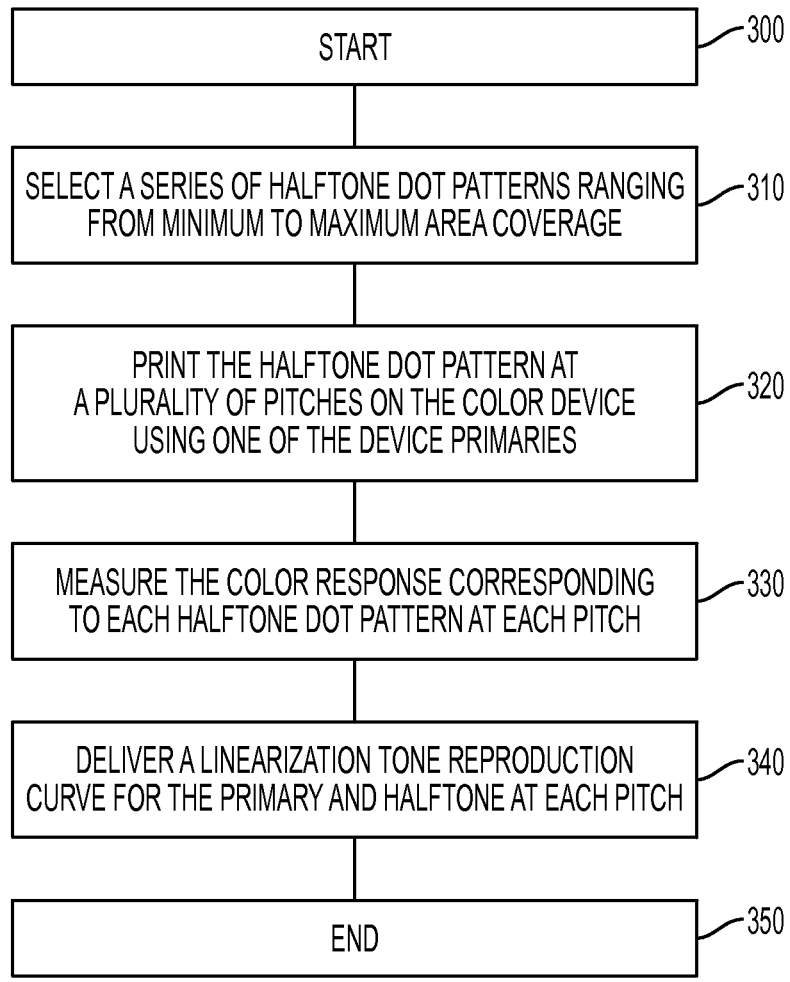
FIG. 3 is a flowchart illustrating the method claim.

FIG. 3 shows a method of using the present application which starts 300 with first selecting a series of halftone dot patterns ranging from minimum to maximum area coverage 310. Then a halftone dot pattern at a plurality of pitches on the color device is printed using one of the device primaries 320. Then a measurement of the color response corresponding to each halftone dot pattern at each pitch 330 is performed. Finally, delivering a linearization tone reproduction curve for the primary and halftone at each pitch 340 is performed. At the end 350 of the method, the linearized tone is produced.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A printing system comprising:
   a marking device including a multi-pitch photoreceptor belt; and
   a controller operatively associated with the multi-pitch marking device, the controller configured to execute a process comprising:
   printing a series of distinct halftone dot patterns on each of a plurality of pitches associated with the marking device, the series of distinct halftone patterns ranging from a minimum to a maximum area coverage;

measuring the color response of the printed series of distinct halftone dot patterns using an inline sensor;

tracking each pitch, creating a pitch-based linearization TRC for each pitch and a pitch based linearization halftone screen for each pitch;

applying an appropriate linearized halftone screen on a per-pitch basis to produce a halftoned image; and the photoreceptor belt receiving the linearized halftoned image and transferring the image directly to a printing surface.

2. The printing system according to claim 1, wherein a correct starting pitch for a print job is conveyed to the controller.

3. The printing system according to claim 2, wherein the controller sequentially cycles through a plurality of linearization screens corresponding to each consecutive pitch as the print job runs.

4. The printing system according to claim 1, wherein the inline sensor is a spectrophotometer.

5. The printing system according to claim 1, the halftone dot patterns are created by running a 10 pitch photoreceptor belt at 21 revolutions for each separation.

6. A method of calibrating an image marking device, comprising the steps:

selecting a series of distinct halftone dot patterns ranging from a minimum to a maximum area coverage;

printing the series of distinct halftone dot patterns at each of a plurality of pitches associated with the image marking device using a device primary colorant;

measuring a color response corresponding to each printed halftone dot pattern at each of the plurality of pitches; and, deriving linearized TRCs and linearized halftone screens for the colorant for each of the plurality of pitches, each pitch associated with a pitch dependent linearized TRC and a pitch dependent linearized halftone screen.

7. The method of claim 6, wherein the series of halftone dot patterns are created by running 10 pitch photoreceptor belts.

8. The method of claim 7, wherein the 10 pitch photoreceptor belts perform 21 revolutions per each of a plurality of color separations.

9. The method of claim 6, wherein the calibration method tracks pitch and updates the corresponding linearization of the halftone screen.

10. The method of claim 6, wherein the method produces a print image by rendering a halftone screen onto a print surface.

11. The method of claim 6, wherein measuring is performed by an inline sensor.

12. The method of claim 6, wherein deriving of the linearization TRC is performed by a control algorithm that uses the halftone dot patterns as actuators.

13. The method of claim 6, wherein the linearized halftone screens are constructed by first building TRCs.

* * * * *